Patented Sept. 2, 1941

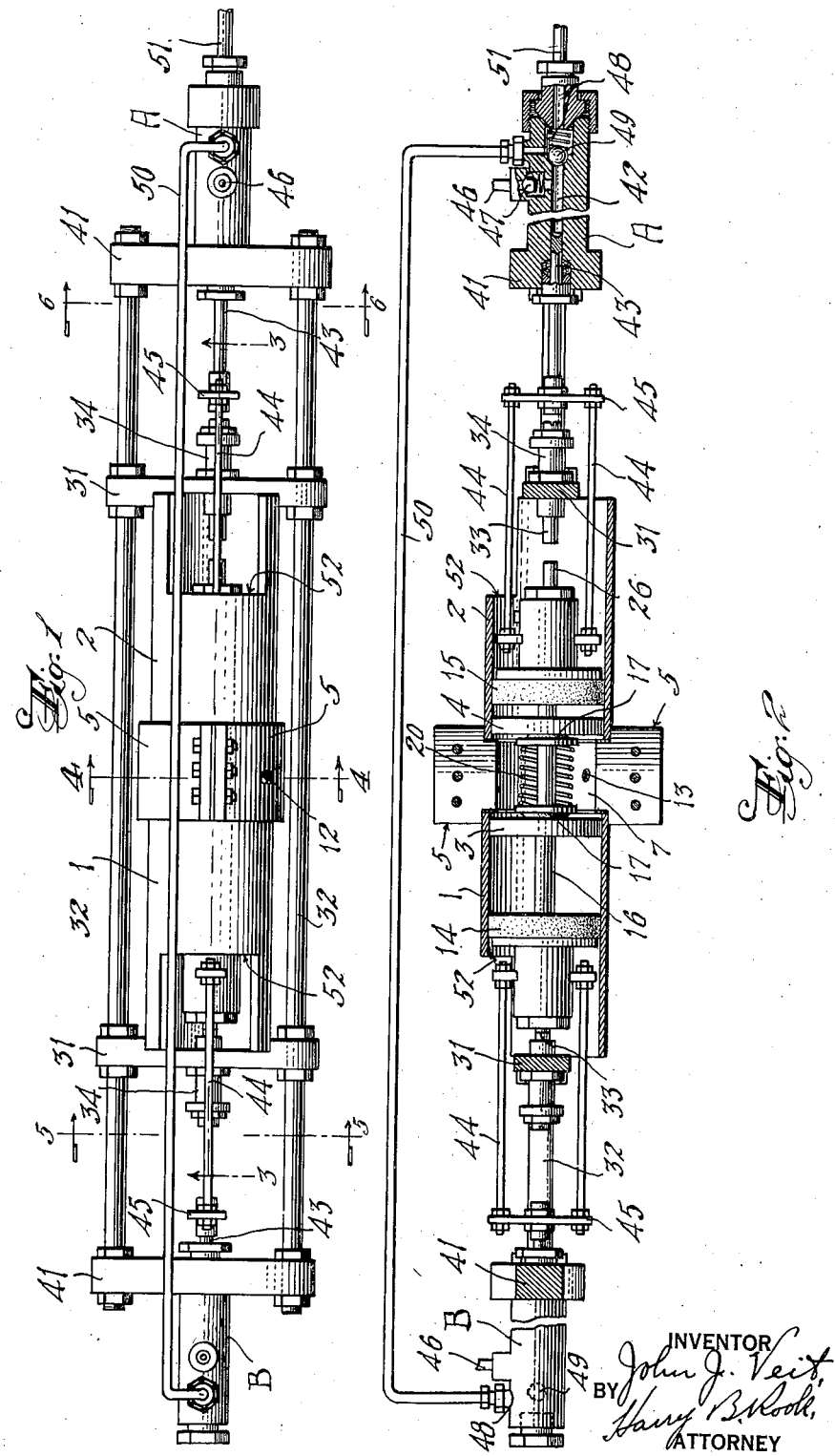

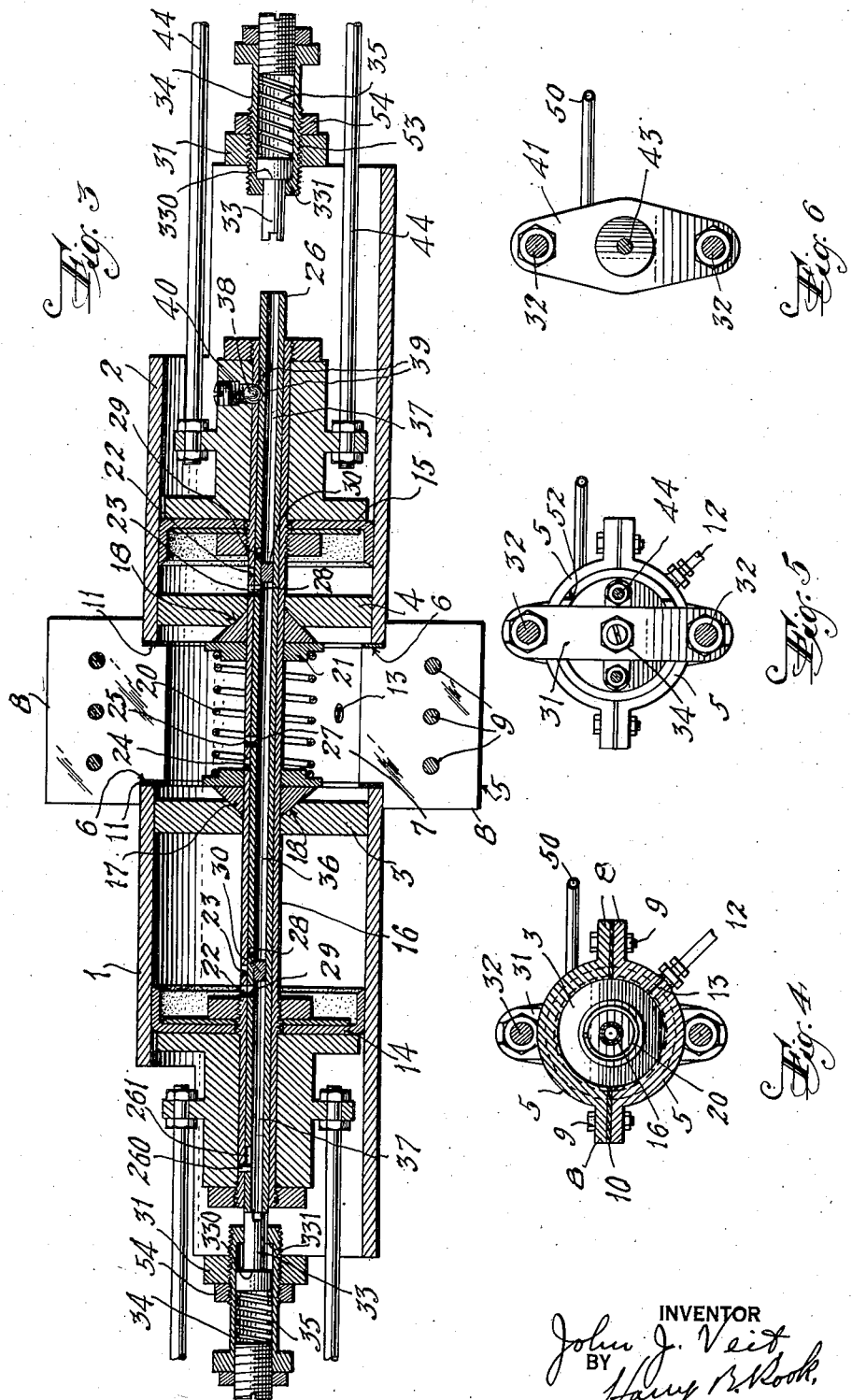

2,254,716

UNITED STATES PATENT OFFICE 2,254,716

FLUID PRESSURE MOTOR FOR GREASE GUNS

John J. Veit, West New York, N. J.

Application April 17, 1941, Serial No. 388,918

10 Claims. (Cl. 121—123)

This invention relates in general to fluid pressure motors for various purposes and more particularly to a double-acting reciprocating motor for driving a pair of grease pumps having a common outlet and reciprocated alternately in opposite directions so that as one pump is charged the other is discharged, whereby to provide a steady stream of lubricant under high pressure.

The invention contemplates a fluid pressure motor of the type that includes two axially alined cylinders or piston chambers in each of which is reciprocable a piston, one object of the invention being to provide a novel and improved valve mechanism for controlling the supply of compressed air from a source to said cylinders alternately, and for controlling exhaust of compressed air from said cylinders.

Another object is to provide in such a fluid pressure motor, a novel and improved construction and combination of said pistons, a piston rod and a valve mechanism, and novel and improved means for automatically actuating said valve mechanism at the limits of reciprocation of said pistons in opposite directions.

A further object is to provide a novel and improved construction and combination of cylinders and means for connecting the cylinders together whereby the motor shall be inexpensive and can be easily and quickly assembled and disassembled for adjustment, repair or replacement of the parts.

Another object is to provide novel and improved construction and combination of a double-acting fluid pressure motor of the character described and a pair of grease pumps, which shall be simple and inexpensive in construction and can be easily and quickly assembled and disassembled.

Other objects, advantages and results of the invention will appear from the following description when read in conjunction with the accompanying drawings in which—

Figure 1 is a top plan view of a combined fluid pressure motor and grease gun embodying my invention.

Figure 2 is a combined side elevational and longitudinal vertical sectional view through the motor and grease gun.

Figure 3 is an enlarged longitudinal vertical sectional view taken on the line 3—3 of Figure 1.

Figures 4, 5 and 6 are transverse vertical sectional views on the lines 4—4, 5—5 and 6—6 of Figure 1.

Specifically describing the invention, my fluid pressure motor includes two axially alined cylinders 1 and 2 which have at their adjacent ends the respective heads or end walls 3 and 4. The adjacent ends of the cylinders are connected together in spaced relation to each other by a sectional casing that comprises two approximately semicircular sections 5 formed with complemental grooves or rabbets 6 in their opposite ends in which the corresponding ends of the cylinders are fitted. The sections 5 are separably connected together to form a chamber 7 between them and the heads 3 and 4 of the cylinders.

As shown, each section has a flange 8 connected to the corresponding flange of the other section by bolts 9; and a gasket 10 is interposed between said flanges, while other gaskets 11 are interposed between the ends of the cylinders and the corresponding grooves 6. The chamber 7 serves as an inlet chamber for the compressed air supply and may be connected to a suitable source of supply as by a pipe 12 that communicates with the chamber through a passage 13.

The ends of the cylinders opposite the respective heads 3 and 4 are open, and within the cylinders are reciprocable the respective pistons 14 and 15 that are rigidly connected by a tubular piston rod or connecting rod 16 that extends entirely through the pistons. For maintaining a fluid tight joint between the piston rod 16 and the cylinder heads 3 and 4, I have shown a conical gasket washer 17 abutting a conical seat 18 in the side of each cylinder head 3 and 4 that faces into the chamber 7. Each gasket 17 surrounds the piston rod 16 and is held in fluid tight engagement with the piston rod and the corresponding seat 18 by a compression spring 20 interposed between rigid bearing plates 21 one of which abuts each of the gaskets 17.

The piston rod 16 forms a part of the valve mechanism for the motor and has a pair of ports 22 and 23 disposed between each piston and the corresponding cylinder head 3 and 4 and another pair of ports 24 and 25 which communicate with the chamber 7. Within the piston rod is reciprocable a valve tube 26 the ends of which project from the corresponding ends of the piston rod. Said tube has a port 27 to cooperate alternately with the ports 24 and 25. The valve tube also has two ports 28 one to cooperate with each of the ports 23, and two ports 29, one to cooperate with each of the ports 22. Between each pair of ports 28 and 29 is a partition 30. These partitions provide three passages in the valve tube, one passage 36 between the port 27 and the two ports 28, and two passages 37, one between each of the ports 29 and the corresponding end of the valve tube which projects from the end of the respective piston and communicates with the atmosphere.

Suitable means such as a pin 260 in one of the pistons and projecting into a slot 261 in the valve tube 26, is provided to positively limit the extent of reciprocation and prevent rotation of the valve tube so as to ensure accurate register of the various said ports.

The cylinders 1 and 2 are held in proper relation to each other by a frame that comprises two cross bars 31, one abutting the outer end of each cylinder, and tie rods 32 connecting said cross bars. Within this frame and particularly in each cross bar 31 is mounted a valve actuator for causing reciprocation of the valve tube 26 to control the flow of fluid to and from the cylinders 1 and 2 in such a manner as to reciprocate the pistons. As shown, each valve actuator includes a plunger 33 that is slidably mounted in a support casing 34 which is in turn secured in the corresponding cross bar 31. The plunger 33 is normally projected outwardly of the casing 34 by a compression spring 35 so as to be abutted by the corresponding end of the valve tube 26, outward movement of the plunger being limited by engagement of a shoulder 330 on the plunger with a shoulder 331 on the casing.

In operation of the motor so far described normally fluid under pressure will be supplied to the chamber 7 from the pipe 12 and both ports 24 and 25 of the piston rod will be in communication with said chamber. Also, the port 27 of the piston rod will be in communication with one or the other of the ports 24 and 25. Assuming the parts to be in the position shown in Figure 3, the fluid under pressure will enter through the ports 25 and 27 into the passage 36 of the valve tube that connects the ports 28, and from said passage to the port 28 corresponding to the piston 15 and through the port 23 into the cylinder 2 between the piston 15 and the corresponding cylinder head 4. The end of the valve tube 26 will project from the piston 15, and both pistons will be actuated toward the right in Figure 3. At the same time the fluid in the cylinder 1 between the piston 14 and the cylinder head 3 will be exhausted to the atmosphere through the ports 22 and 29 and the passage 37 of the valve tube that opens to the atmosphere.

After a stroke of the pistons of a predetermined length that is controlled by the position of the plunger 33, the end of the valve tube 26 will abut the plunger 33 and move the latter against the influence of the spring 35 until the force produced by the spring overcomes the frictional resistance to sliding of the valve tube in the piston rod, whereupon the valve tube will be slid with a snap action through the piston rod and to the left of Figure 3.

When this occurs, the port 27 of the valve tube is brought into register with the port 24 of the piston rod, while the port 28 of the valve tube corresponding to the piston 14 is brought into communication with the port 23 of the piston rod corresponding to said pistons 14. This causes fluid under pressure to enter the cylinder 1 between the piston 14 and the cylinder head 3 so as to move the pistons to the left of Figure 3. At the same time, the fluid in the cylinder 2 will be exhausted through the ports 22 and 29 corresponding to the piston 15 and through the passage 37 of the valve tube to the atmosphere. Such movement of the pistons will continue until the valve tube 26 is again actuated by the plunger 33 corresponding to the cylinder 1 so as to reverse the direction of movement of the pistons, and the pistons will continue to reciprocate.

An important feature of my invention is means for assuring snap action of the valve tube 26 and accurate register of the various valve ports. This is effected in part by the spring plunger 33 and in part by a spring detent that is shown as comprising a ball 38 mounted in one of the pistons to alternately engage recesses 39 in the valve tube 26, said ball being normally influenced to snap into one or the other of said recesses by a spring 40.

Obviously the detent ball 38 will engage one of the recesses 39 when the valve tube 26 is in one position and will engage the other recess 39 when the valve tube 26 is in its other position. The detent ball will limit movement of the valve tubes in both directions and will also resist movement of the valve tube under the influence of the spring plunger 33 so as to ensure a snap action of the valve tube.

For varying the length of stroke of the pistons, the positions of the valve actuating plunger 33 may be varied as by a screw threaded connection 53 between the support casing 34 and the corresponding cross bar 31, and screwing the casing into or out of the cross bar. If desired a lock nut 54 may be provided for holding the support casing in adjustable position.

As hereinbefore pointed out, my motor is intended primarily for use with a double-acting grease gun. As shown, this grease gun includes two pump cylinders A and B that are mounted on the respective frame bars 41 which are in turn connected together and to the motor frame by the tie rods 32. Each pump includes a cylinder 42 in which is reciprocable a piston 43 that is connected to the corresponding piston 1 or 2 by connecting rods 44 one end of each of which is connected to the corresponding motor piston 1 and 2 while the other end is connected to a cross head 45 which is in turn connected to the corresponding pump piston 43.

Each pump cylinder 42 has a grease inlet 46 controlled by an inlet check valve 47, and an outlet 48 controlled by an outlet check 49, all as usual. The outlet of one of the pumps, in the present instance the pump B is connected by a pipe 50 to the outlet of the other pump A, and the outlet 48 of the latter pump may be connected to a hose or other distributing conduit 51 to which a constant stream of lubricant will be supplied by reciprocation of the pump pistons 43 under the power of the fluid pressure motor.

It will be observed that the combined motor and pump can be easily and quickly assembled and disassembled by simple disconnection of the cross bars 41 and 31 from the tie rods 32 and by disconnection of the connecting rods 44 from the pistons 14 and 15 and the corresponding cross heads 45. Also, the casing sections 5, 5 can be easily and quickly separated for disconnection of the cylinders 1 and 2. If desired, the side walls of the outer ends of the cylinders may be cut away as at 52 for access to the adjacent parts.

While I have shown and described my invention as embodied in certain details of structure it will be understood that this is primarily for illustrating the principles of my invention and that many modifications and changes may be made in the details of structure without departing from the spirit or scope of the invention.

Having thus described my invention, what I claim is:

1. A fluid pressure motor comprising a casing forming a fluid pressure inlet chamber, two axially alined cylinders, one at each of opposite sides of said chamber, a piston reciprocable in each of said cylinders, a tubular piston rod connecting said pistons and passing through said chamber, a valve tube reciprocable in said piston rod, said piston rod having ports and said valve tube having ports and passages cooperating with said ports of the piston rod upon reciprocation of said valve tube for automatically controlling the supply of fluid pressure from said chamber alternately to said cylinders and for controlling the exhaust of fluid pressure from said cylinders, and abutment means to be engaged by said valve tube upon movement of said pistons in either direction to slide said valve tube in said piston rod and change the relation of said ports to cause movement of the pistons in the opposite direction.

2. The fluid pressure motor set forth in claim 1 wherein each cylinder has an end wall in common with a wall of said chamber, the other end of each cylinder is open to the atmosphere, and said piston rod and said valve tube extend through said pistons and have their ends in communication with the atmosphere at said open ends of the respective cylinders.

3. A fluid pressure motor comprising two spaced axially alined cylinders each having a head at its end adjacent the other cylinder, a sectional casing connecting said ends of the cylinders and forming a chamber between itself and the heads of said cylinders, a piston reciprocable in each cylinder, a tubular piston rod connecting said pistons and passing through said chamber, a valve tube reciprocable in said piston rod, said piston rod having ports and said valve tube having ports and passages cooperating with said ports of the piston rod upon reciprocation of said valve tube for automatically controlling the supply of fluid pressure from said chamber alternately to said cylinders and for controlling the exhaust of fluid pressure from said cylinders, and abutment means to be engaged by said valve tube upon movement of said pistons in either direction to slide said valve tube in said piston rod and change the relation of said ports to cause movement of the pistons in the opposite direction.

4. The fluid pressure motor set forth in claim 3 wherein the other ends of said cylinders are open to the atmosphere, and said piston rod and said valve tube extend through said pistons and have their ends in communication with the atmosphere at said open ends of the respective cylinders.

5. A fluid pressure motor comprising two spaced axially alined cylinders each having a head at its end adjacent the other cylinder, a casing into the ends of which said ends of the cylinders are fitted to form a chamber between said casing and said cylinder heads, a frame including a cross bar abutting the other end of each cylinder, tie rods separably connecting said cross bars, a piston reciprocable in each cylinder, and valve means for controlling the supply of fluid pressure from said chamber alternately to said cylinders and for controlling the exhaust of fluid pressure from said cylinders to cause said pistons to reciprocate.

6. A fluid pressure motor comprising a casing forming fluid pressure inlet chamber, two axially alined cylinders one at each of opposite sides of said chamber, a piston reciprocable in each of said cylinders, a tubular piston rod connecting said pistons and passing through said chamber, the ends of said cylinders opposite said chamber open to the atmosphere, a valve tube reciprocable in said piston rod with its ends communicating with the atmosphere at the said open ends of the respective cylinders, said piston rod having ports and said valve tube having ports and passages to cooperate with said parts of the piston rod, certain of which control flow of fluid from said chamber into said valve tube while others control flow of fluid from said valve tube into the respective cylinders, said piston rod and valve tube also having cooperating ports for exhausting of fluid from said cylinders through the ends of said valve tube to the atmosphere, said ports being arranged so that fluid is admitted to one cylinder and exhausted from the other when the valve tube is in one position and fluid is exhausted from said one cylinder and admitted to the other when the valve tube is in another position, and means to be abutted by said valve tube upon movement of said pistons in either direction to slide said valve tube in said piston rod and change the relation of said ports in the valve tube to the ports in the piston rod to reverse the direction of movement of said pistons.

7. The fluid pressure motor set forth in claim 1 with the addition of spring detent means for releasably holding said valve tube against movement in each of opposite directions to ensure accurate registry of the ports of said valve tube with the ports in the piston rod.

8. The fluid pressure motor set forth in claim 1 with the addition of spring detent means for releasably holding said valve tube against movement in each of opposite directions to ensure accurate registry of the ports of said valve tube with the ports in the piston rod and wherein said abutment means is resiliently yieldable under influence of the movement of said valve tube by said pistons to cause a snap action of said valve tube.

9. The fluid pressure motor set forth in claim 6 with the addition of spring detent means for releasably holding said valve tube against movement in each of opposite directions to ensure accurate registry of the ports of said valve tube with the ports in the piston rod.

10. The fluid pressure motor set forth in claim 6 with the addition of spring detent means for releasably holding said valve tube against movement in each of opposite directions to ensure accurate registry of the ports of said valve tube with the ports in the piston rod and wherein said abutment means is resiliently yieldable under influence of the movement of said valve tube by said pistons to cause a snap action of said valve tube.

JOHN J. VEIT.